(12) United States Patent
Suzuki et al.

(10) Patent No.: US 8,887,165 B2
(45) Date of Patent: Nov. 11, 2014

(54) REAL TIME SYSTEM TASK CONFIGURATION OPTIMIZATION SYSTEM FOR MULTI-CORE PROCESSORS, AND METHOD AND PROGRAM

(75) Inventors: Noriaki Suzuki, Tokyo (JP); Masato Edahiro, Tokyo (JP); Junji Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 261 days.

(21) Appl. No.: 13/579,865

(22) PCT Filed: Feb. 2, 2011

(86) PCT No.: PCT/JP2011/052084
§ 371 (c)(1),
(2), (4) Date: Sep. 14, 2012

(87) PCT Pub. No.: WO2011/102219
PCT Pub. Date: Aug. 25, 2011

(65) Prior Publication Data
US 2012/0331474 A1    Dec. 27, 2012

(30) Foreign Application Priority Data

Feb. 19, 2010   (JP) .................................. 2010-034736

(51) Int. Cl.
*G06F 9/46*      (2006.01)
*G06F 9/48*      (2006.01)

(52) U.S. Cl.
CPC ........ *G06F 9/4887* (2013.01); *G06F 2209/483* (2013.01)
USPC ........... 718/103; 718/100; 718/102; 718/106; 718/107; 718/108

(58) Field of Classification Search
None
See application file for complete search history.

(56) References Cited

U.S. PATENT DOCUMENTS

| | | | |
|---|---|---|---|
| 2002/0138542 A1* | 9/2002 | Bollella et al. ................. | 709/102 |
| 2002/0165900 A1 | 11/2002 | Kubo et al. | |
| 2007/0113231 A1* | 5/2007 | Honmura ....................... | 718/100 |
| 2007/0220517 A1* | 9/2007 | Lippett ......................... | 718/102 |
| 2008/0263073 A1* | 10/2008 | Ohba et al. .................... | 707/101 |

FOREIGN PATENT DOCUMENTS

| | | |
|---|---|---|
| JP | 07-121486 A | 5/1995 |
| JP | 9-218861 A | 8/1997 |
| JP | 2002-278945 A | 9/2002 |
| JP | 2006-133995 A | 5/2006 |
| JP | 2007-18268 A | 1/2007 |
| JP | 4016010 B2 | 12/2007 |

OTHER PUBLICATIONS

Shiroishi Hiromitsu et al., "Real Time Systems: Theory and Applications", Sep. 1, 2001, pp. 35-56.

* cited by examiner

*Primary Examiner* — Emerson Puente
*Assistant Examiner* — Dong Kim
(74) *Attorney, Agent, or Firm* — Sughrue Mion, PLLC

(57) ABSTRACT

Disclosed is an automatic optimization system capable of searching for an allocation with a good performance from among a plurality of task allocations which can be scheduled in a system of a development target configured with a plurality of periodic tasks. A task allocation optimization system for a multi-core processor including a plurality of cores calculates a response time of each of a plurality of tasks which are core allocation decision targets, and outputs an accumulative value of the calculated response time as an evaluation function value which is an index representing excellence of a task allocation. A task allocation from which a good evaluation function value is calculated is searched based on the evaluation function value. A candidate having a good evaluation function value among a plurality of searched task allocation candidates is held.

17 Claims, 13 Drawing Sheets

REAL TIME SYSTEM TASK CONFIGURATION OPTIMIZATION SYSTEM FOR MULTI-CORE PROCESSORS, AND METHOD AND PROGRAM

CROSS REFERENCE TO RELATED APPLICATIONS

This application is a National Stage of International Application No. PCT/JP2011/052084 filed on Feb. 2, 2011, which claims priority from Japanese Patent Application No. 2010-034736, filed on Feb. 19, 2010, the contents of all of which are incorporated herein by reference in their entirety.

TECHNICAL FIELD

The present invention relates to a task allocation, and more particularly, to a multi-core task allocation for a real-time system.

BACKGROUND ART

In recent years, as the demands of digital devices with high performance and low power consumption increase, a multi-core configuration in which a plurality of processors are mounted in an embedded large scale integration (LSI) is attracting attention as a promising solution. This multi-core configuration is becoming a mainstream in a real-time system which is aimed at system control or the like.

Meanwhile, in a real-time system in which multiple cores are mounted, it is necessary to guarantee that applications executed in parallel can be scheduled without any deadline miss. As an example of a technique of solving this problem, "real-time scheduling possibility determining method and real-time system" is disclosed in Patent Literature 1.

The technique disclosed in Patent Literature 1 provides a scheduling possibility determining method usable when a plurality of processors are simultaneously necessary to execute a single task in a real-time system in which multiple cores are mounted.

Next, the technique disclosed in Patent Literature 1 will be described with reference to FIG. 13. FIG. 13 is a diagram corresponding to FIG. 2 of Patent Literature 1. A scheduling possibility determining unit 300 illustrated in FIG. 13 determines whether or not scheduling is possible by the following determination method.

Specifically, let us define:

Lk: a value that allows an actual average load of a certain time period to be necessarily equal to or more than itself when a task k incurs a deadline miss;

Uk,i: a value that is guaranteed to be equal to or larger than an average single load time of a task i during an average load time period of the task k when the task k incurs a deadline miss; and Mi: the number of processors simultaneously used by the task i.

In this case, it is determined that real-time scheduling is possible when all of tasks satisfy:

$$\Sigma i=1 \ldots N M_i * U_{k,i} \leq L_k$$

Using this method, in the technique disclosed in Patent Literature 1, it is possible to determine a scheduling possibility when a plurality of processors are simultaneously necessary to execute a single task.

CITATION LIST

Patent Literature

{PTL 1} JP 4016010 B1

Non-Patent Literature

{NPLT} "Real Time Systems: Theory and Applications" written by Shiroishi Hiromitsu/Takegaki Moriichi, Asakura Shoten, Sep. 1, 2001, pp. 35 to 56

SUMMARY OF INVENTION

Technical Problem

As described above, it can be determined whether or not scheduling is possible using the technique disclosed in PLT 1.

However, a general technique represented by the technique disclosed in PLT 1 has the following several problems.

A first problem is that it is difficult to search for an allocation with a good performance from among a plurality of task allocations that can be scheduled.

The reason is because in the general technique, it is only possible to determine whether or not real-time scheduling is possible, but it is difficult to determine excellence in performance of each of a plurality of candidates that can be scheduled.

A second problem is that it is difficult to increase the margin from a deadline which is an important index in a real-time system from a point of view of system stability.

The reason is because in the general technique of determining whether or not real-time scheduling is possible, processing is performed regardless of whether the margin from a deadline is large or small.

In this regard, it is a first object of the present invention to provide a multi-core task allocation optimization system for a real-time system which is capable of searching for an allocation with a good performance from a plurality of task allocations that can be scheduled, a method thereof, and a program thereof.

Further, it is a second object of the present invention to provide a multi-core task allocation optimization system for a real-time system which is capable of increasing the margin from a deadline which is an important index in a real-time system from a point of view of system stability, a method thereof, and a program thereof.

Solution to Problem

According to a first aspect of the present invention, there is provided a task allocation optimization system for a multi-core processor including a plurality of cores, including: an accumulative response time calculating unit that calculates a response time of each of a plurality of tasks which are core allocation decision targets, and outputs an accumulative value of the calculated response time as an evaluation function value which is an index representing excellence of a task allocation; a searching unit that searches for a task allocation from which a good evaluation function value is calculated based on the evaluation function value; and a high evaluation candidate holding unit that holds a candidate having a good evaluation function value among a plurality of task allocation candidates searched by the searching unit.

According to a second aspect of the present invention, there is provided a task allocation optimization method for a multi-core processor including a plurality of cores, which includes an accumulative response time calculating step of calculating a response time of each of a plurality of tasks which are core allocation decision targets, and outputting an accumulative value of the calculated response time as an evaluation function value which is an index representing excellence of a task allocation, a searching step of searching for a task allocation from which a good evaluation function value is calculated based on the evaluation function value, and a high evaluation candidate holding step of holding a candidate having a good evaluation function value among a plurality of task allocation candidates searched by the searching step.

According to a third aspect of the present invention, there is provided a task allocation optimization program that is incorporated in a task allocation optimization system for a multi-core processor including a plurality of cores and causes a computer to function as a system which includes an accumulative response time calculating unit that calculates a response time of each of a plurality of tasks which are core allocation decision targets, and outputs an accumulative value of the calculated response time as an evaluation function value which is an index representing excellence of a task allocation, a searching unit that searches for a task allocation from which a good evaluation function value is calculated based on the evaluation function value, and a high evaluation candidate holding unit that holds a candidate having a good evaluation function value among a plurality of task allocation candidates searched by the searching unit.

Advantageous Effect of the Invention

According to the present invention, an allocation with a good performance can be searched for from among a plurality of task allocations that can be scheduled.

The reason is because a task allocation with a good performance is obtained by calculating an evaluation function value which is an index representing excellence in performance of a task allocation candidate and performing optimization using the evaluation function value.

Further, according to the present invention, it is possible to increase the margin from a deadline which is an important index in a real-time system from a point of view of system stability.

The reason is because a task allocation causing a response time of each task to be as small as possible is obtained by calculating an accumulative value of a response time (a time until execution of a task finishes after task activation is instructed) of each of a plurality of tasks which are core allocation decision targets and performing optimization to minimize an accumulative value of a response time of each of a plurality of tasks which are core allocation decision targets.

REFERENCE SIGNS LIST

Figure 1:
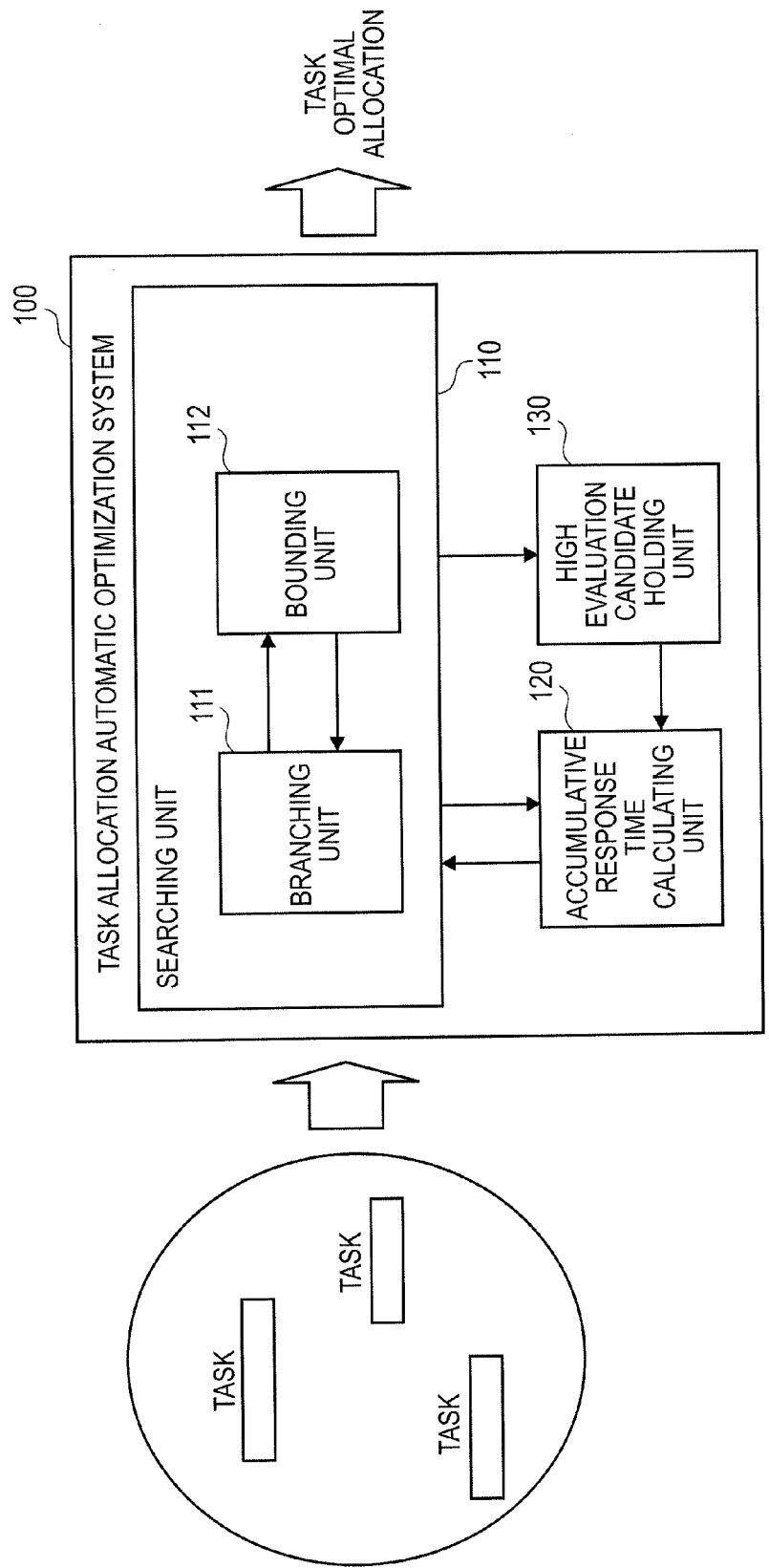
{FIG. 1} A block diagram illustrates a basic configuration according to an embodiment of the present invention and each embodiment.

100: task allocation automatic optimization system
110: searching unit
111: branching unit
112: bounding unit
112-1: fixed task accumulative response time calculation instructing unit
112-2: shortest non-fixed task response time integrating unit
112-3: non-fixed task execution time summing unit
112-4: non-fixed task execution time integrating unit
113: bounding deterring unit
120: accumulative response portion calculating unit
120-1: response time calculating unit
120-2: response time accumulating unit
130: high evaluation candidate holding unit
140: approximate solution searching unit
200: computer
210: processor
220: auxiliary storage device
221: automatic task allocation optimization program
222-1, 222-2, 222-3: task
223: optimal task allocation definition file
224: task set definition file
230: main storage device
300: scheduling possibility determining unit

DESCRIPTION OF EMBODIMENTS

Next, a configuration and an operation of a task allocation optimization system for embodying the present invention will be described using a concrete embodiment.

In this disclosure, for example, when a plurality of cores are present and numbering a core number to identify each core is performed, numbering is performed starting from 0 as in "a core 0, a core 1, a core 2, . . . , and the like."

{Embodiment}

FIG. 1 is a block diagram illustrating an overall configuration of an automatic optimization system 100 according to an embodiment of the present invention. Referring to FIG. 1, the automatic optimization system 100 includes a searching unit 110, an accumulative response time calculating unit 120, and a high evaluation candidate holding unit 130. Further, the searching unit 110 includes a branching unit 111 and a bounding unit 112. As will be described later, the branching unit 111 is a portion related to generation of a sub problem. The bounding unit 112 is a portion related to exclusion of an unnecessary candidate.

Figure 2:
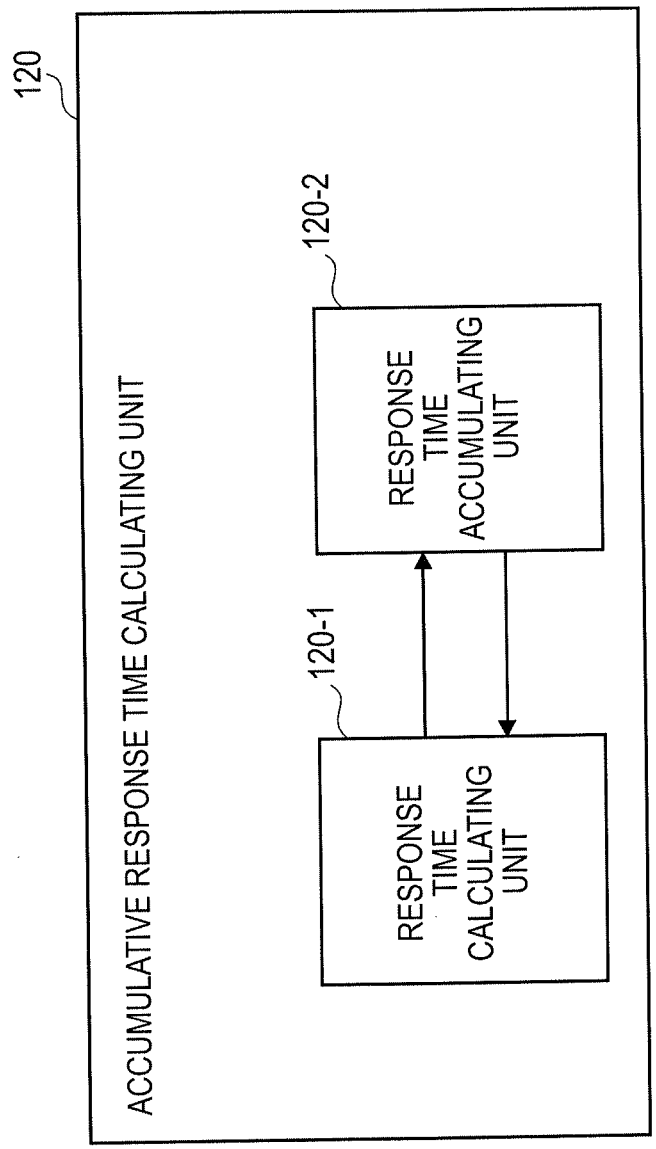
{FIG. 2} A diagram illustrates a basic configuration of an accumulative response time calculating unit according to an embodiment of the present invention and each embodiment.

Next, the details of the accumulative response time calculating unit 120 will be described with reference to FIG. 2. As illustrated in FIG. 2, the accumulative response time calculating unit 120 includes a response time calculating unit 120-1 and a response time accumulating unit 120-2.

The automatic optimization system 100 may be implemented by reading a program (software) through a hardware resource such as a processor.

In other words, an information processing apparatus (machine) specific to the purpose of use or an operation method thereof is constructed such that software is installed in a computer, and a calculation or processing of information according to the purpose of use is implemented by a concrete portion in which software and a hardware resource work together.

Figure 3:
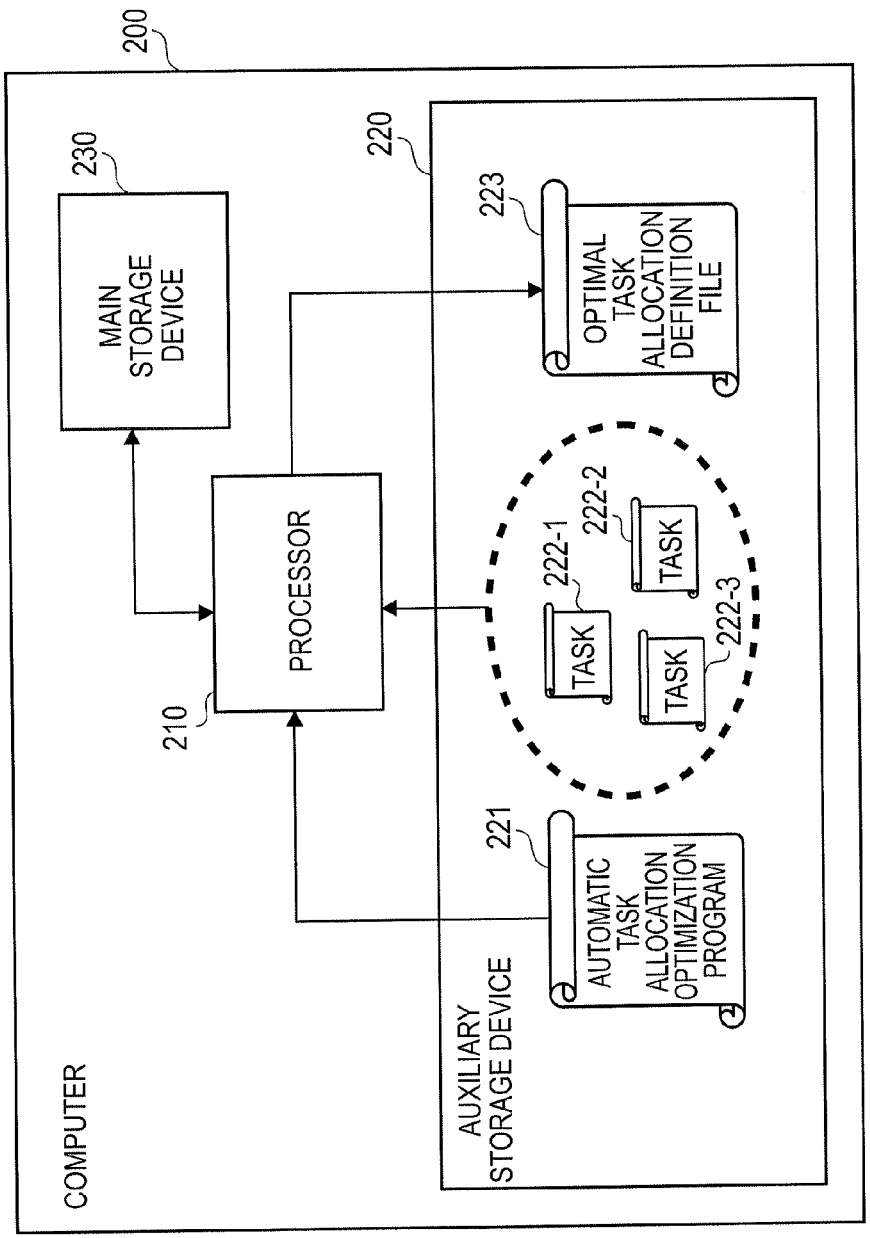
{FIG. 3} A diagram illustrates an implementation example (1/2) by hardware and software of the present invention.
Figure 4:
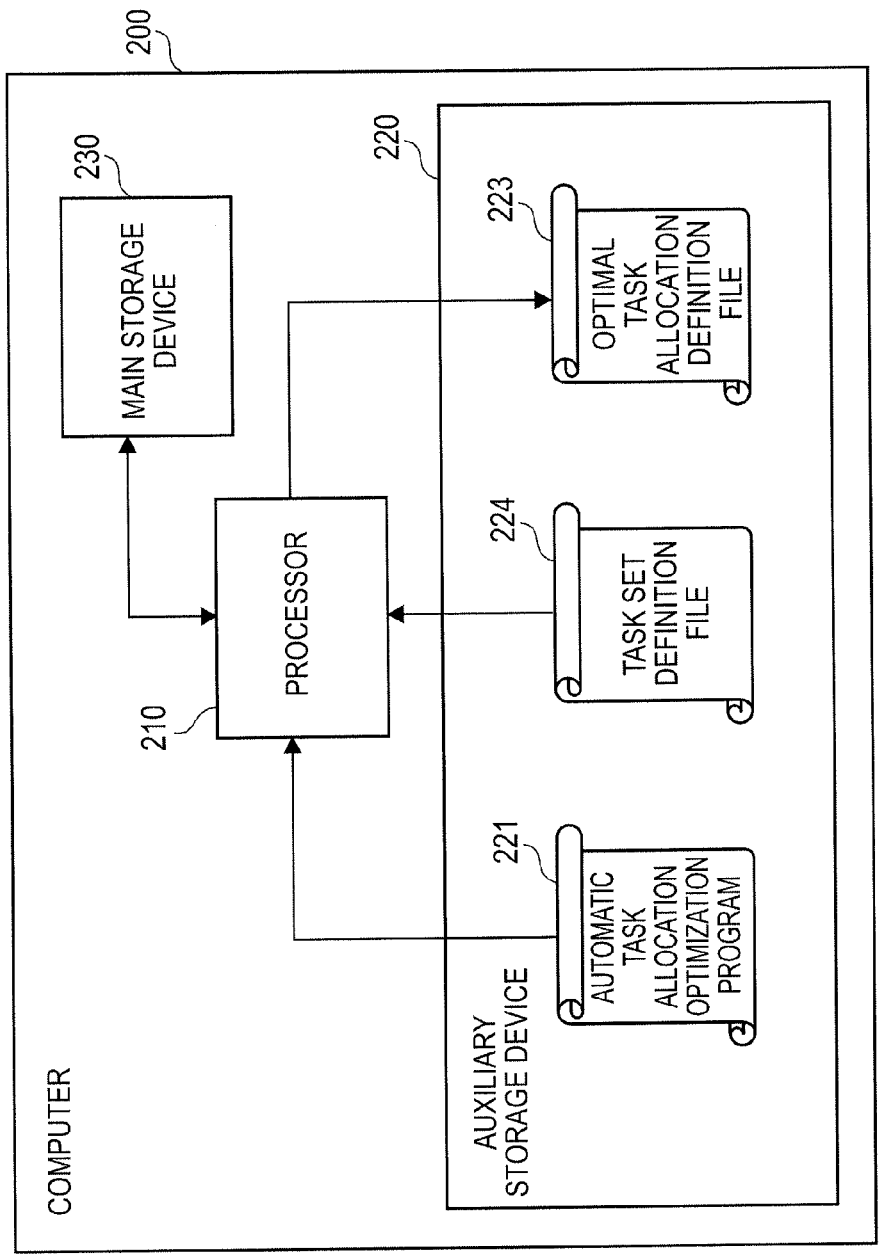
{FIG. 4} A diagram illustrates an implementation example (2/2) by hardware and software of the present invention.

FIGS. 3 and 4 illustrate a computer 200 as a concrete implementation example of the data processing apparatus 100.

Referring to FIG. 3, the computer 200 includes a processor 210, an auxiliary storage device 220, and a main storage device 230.

The processor 210 is an arithmetic processing unit. The auxiliary storage device 220 is a storage device represented by a hard disk drive (HDD) or a solid state drive (SSD), and stores various data or a program. In FIG. 3, illustrated are an automatic task allocation optimization program 221, tasks (a task 222-1, a task 222-2, and a task 222-3 are illustrated), and an optimal task allocation definition file 223. The main storage device 230 is a storage device represented by a random access memory (RAM), and is a storage unit used when the processor 210 performs a calculation process.

The automatic task allocation optimization program 221 read from the auxiliary storage device 220 and then executed by the processor 210 reads information of the task 222-1, the task 222-2, and the task 222-3 which are optimization targets from the auxiliary storage device 220, and performs task allocation optimization using the storage device 230. An optimal task allocation obtained as a result of optimization is output to the auxiliary storage device 220 as the optimal task allocation definition file 223.

Next, referring to FIG. 4, the auxiliary storage device 220 includes a task set definition file 224 instead of the task 222-1, the task 222-2, and the task 222-3.

The automatic task allocation optimization program 221 read from the auxiliary storage device 220 and then executed by the processor 210 reads the task set definition file 224, in which information related to a plurality of tasks which are optimization targets are defined, from the auxiliary storage device 220, and performs task allocation optimization using the storage device 230. An optimal task allocation obtained as a result of optimization is output to the auxiliary storage device 220 as the optimal task allocation definition file 223.

Next, functions of the components described with reference to FIGS. 1 and 2 will be described in detail.

The searching unit 110 searches for core allocations of a plurality of tasks, and generates a task allocation candidate. This search is performed using a branch and bound (B&B) method including a branching process of generating a sub problem and a bounding process of excluding an unnecessary candidate.

The accumulative response time calculating unit 120 calculates a response time of each of a plurality of tasks which are core allocation decision targets using the task allocation candidate as an input, calculates an accumulative value of a response time as an evaluation function value which is an index representing excellence of a task allocation, and outputs the evaluation function value.

The high evaluation candidate holding unit 130 holds a candidate with a high evaluation function value among the task allocation candidates.

Next, the branching unit 111 and the bounding unit 112 in the searching unit 110 will be described.

Figure 5:
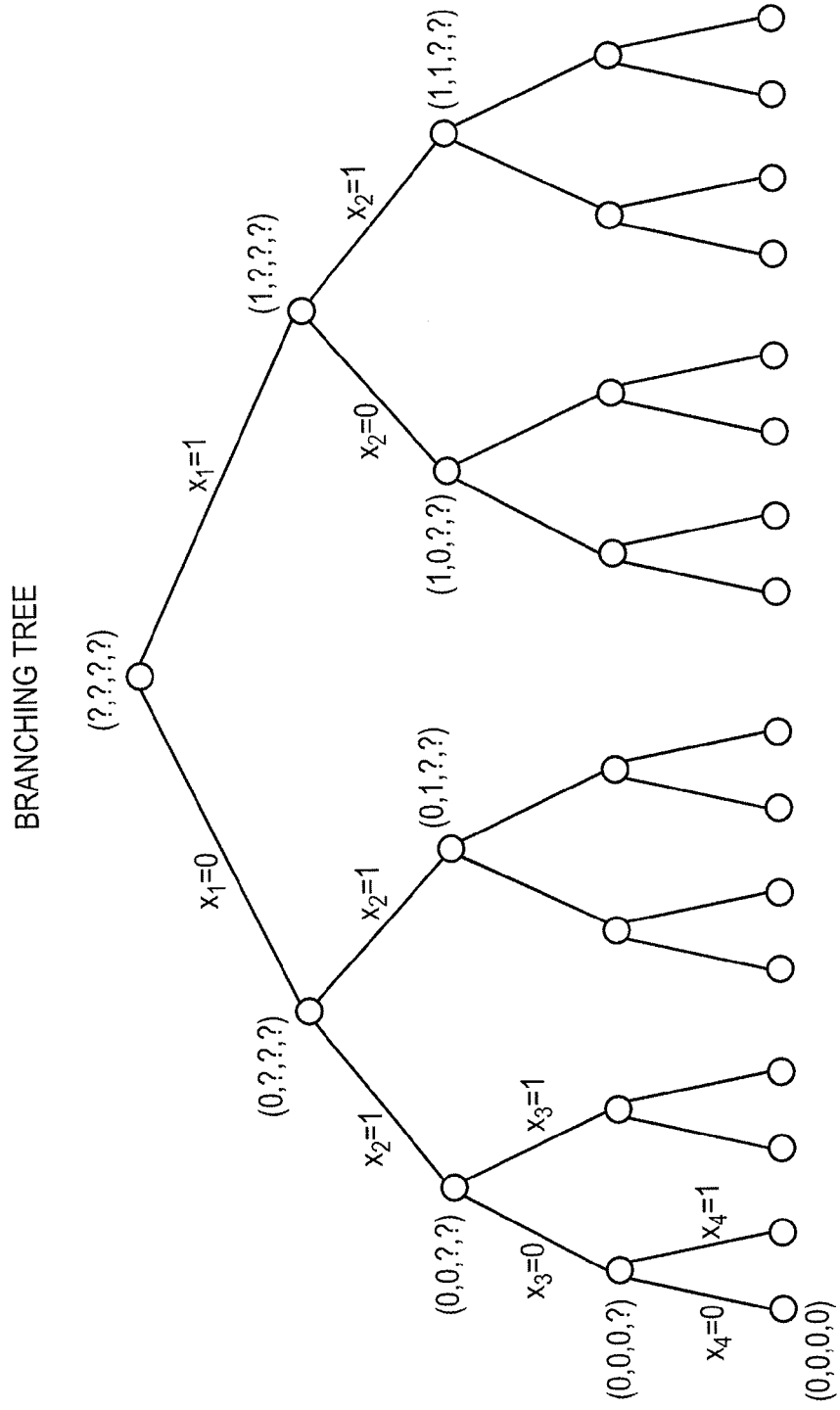
{FIG. 5} A branching tree illustrates an operation according to an embodiment of the present invention and each embodiment.

As illustrated in FIG. 5, the branching unit 111 comprehensively generates task allocation candidates to be searched such that a sub problem (indicated by a circle in FIG. 5) is generated by fixing a task to a core, starting from a task with a high priority (downward in FIG. 5). At this time, when generation of a sub problem is repeated and so allocations of all tasks are completed, task allocation candidates (in the lowest tier in FIG. 5) are generated. For the sake of convenient description, FIG. 5 assumes a dual-core system. However, a target of the present technique of comprehensively generating task allocation candidates is not limited to a dual-core system, and the present technique can be similarly extended to a system having an arbitrary number of three or more cores.

The bounding unit 112 calculates a bound value (which is a value predicable to be never better, and refers to a lower bound value when an evaluation function in which a good allocation is represented by a small value is used and an upper bound value when an evaluation function value in which a good allocation is represented by a large value is used) of an evaluation function permissible to a sub problem using at least one of an evaluation function value calculated using a task already fixed to a core, a response time of a task with a lowest priority in each core among tasks in which core allocation is already fixed, and an execution time of a task in which a core allocation is not decided.

When the bound value of the evaluation function value is worse than a score of another task allocation candidate which has been already found, it is difficult to obtain a task allocation candidate better than another task allocation candidate even if the sub problem search is further performed, and thus a bounding process of deterring the search is performed. When the bounding process is performed, the branching unit 111 does not generate a sub problem anymore.

Next, the response time calculating unit 120-1 and the response time accumulating unit 120-2 in the accumulative response time calculating unit 120 illustrated in FIG. 2 will be described.

The response time calculating unit 120-1 calculates a response time (a time until execution of a task finishes after task activation is instructed) of a corresponding task on each of a plurality of tasks.

The response time accumulating unit 120-2 sums the response times of the tasks calculated by the response time calculating unit 120-1, and calculates the accumulative response time.

Next, an operation of the automatic optimization system according to an embodiment of the present invention will be described with reference to a flowchart of FIG. 6.

For convenience sake, an operation assuming a dual-core system will be described, but an application target of the present technique is not limited to a dual-core system, and the present technique can be similarly applied to a system having an arbitrary number of three or more cores.

First, in step S11, the searching unit 110 determines whether or not a currently dealt sub problem is a task candidate. Here, a task candidate corresponds to a sub problem in which all tasks are fixed. When the currently dealt sub problem is not a task candidate (No in step S11), the process proceeds to step S12. However, when the currently dealt sub problem is a task candidate (Yes in step S11), the process proceeds to step S16.

Next, in step S12, the bounding unit 112 of the searching unit 110 performs a calculation of a bounding formula, and calculates a bound value (a value predicable to be never better) of an evaluation function value permissible to a sub problem.

Thereafter, in step S13, the bounding unit 112 compares the bound value of the evaluation function value with the evaluation function value which the accumulative response time calculating unit 120 has calculated on the task allocation candidate held in the high evaluation candidate holding unit 130. When it is determined that there is a possibility to update the evaluation function value as a result of comparison (Yes in step S13), the process proceeds to step S14. However, when it is determined that there is no possibility to update (No in step S13), a bounding process is performed, and the process finishes without generating a sub problem anymore.

When it is determined in step S13 that there is a possibility to update the evaluation function value (Yes in step S13), in step S14, the branching unit 111 generates a sub problem in which a core allocation of a task to be fixed next is set to 0 (zero). The generated sub problem is subjected to the process based on the flowchart of FIG. 6 in the same manner as the operation described herein. Subsequently, in step S15, the branching unit 111 generates a sub problem in which a core allocation of a task to be fixed next is set to 1 (one). The generated sub problem is similarly subjected to the process based on the flowchart of FIG. 6.

Meanwhile, when the currently dealt sub problem is a task candidate in step S11 (Yes in step S11), in step S16, the searching unit 110 calculates an evaluation function value of a task allocation candidate each time the task allocation candidate is transferred to the accumulative response time generating unit 120. Thereafter, in step S17, the searching unit 110 compares the evaluation function value calculated in step S16 with the evaluation function value of the task allocation candidate held in the high evaluation candidate holding unit 130. Preferably, the evaluation function value of the task allocation candidate held in the high evaluation candidate holding unit 130 is not calculated each time, but an evaluation function value which is calculated once is held. When the current evaluation function value of the task allocation candidate represents a better value as a result of comparison (Yes in step S17), in step S18, the searching unit 110 registers the current task allocation candidate to the high evaluation candidate holding unit 130 as a high evaluation candidate, and then the process finishes. However, when the current evaluation function value of the task allocation candidate is not good (No in step S17), the process finishes as is.

Next, an effect in an embodiment of the present invention will be described.

In the embodiment of the present invention, a task allocation of high performance can be obtained such that the accumulative response time calculating unit 120 calculates the evaluation function value which is an index representing excellence in performance of a task allocation candidate and performs optimization using the evaluation function value. For this reason, it is possible to provide the automatic optimization system capable of searching for a high-performance allocation among from a plurality of task allocations that can be scheduled. Further, a task allocation in which a response time of each task becomes as short as possible can be obtained such that the accumulative response time calculating unit 120 calculates an accumulative value of respective response times (a time until execution of a task finishes after task activation is instructed) of a plurality of tasks which are core allocation decision targets and performs optimization to minimize an accumulative value of response times of a plurality of tasks which are core allocation decision targets. For this reason, it is possible to increase the margin from a deadline which is an important index in a real-time system from a point of view of system stability. Further, when a task allocation candidate is searched, the bounding unit performs the bounding operation of deterring an unnecessary task allocation candidate from being searched. Accordingly, a time necessary for optimization can be reduced.

{First Embodiment}

Next, a configuration and an operation of the task allocation optimization system 100 for embodying the present invention will be described using concrete embodiments.

Figure 6:
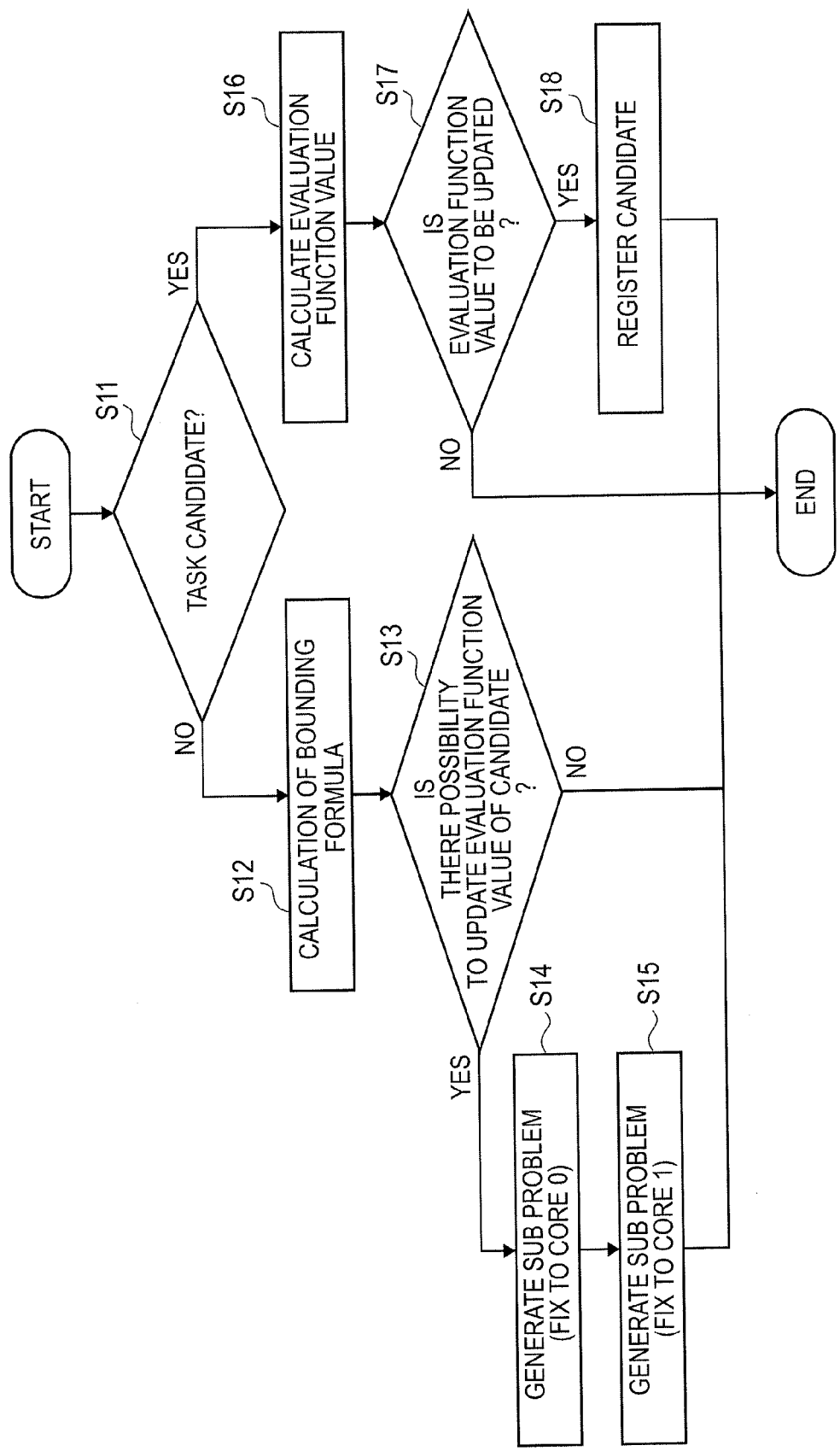
{FIG. 6} A flowchart illustrates a basic operation according to an embodiment of the present invention and each embodiment.

A basic configuration of the first embodiment is the same as the configuration and operation of the task allocation automation system 100 described as the embodiment in FIGS. 1, 2, and 6. However, in the first embodiment, a concrete configuration example of the bounding unit 112 will be described with reference to FIG. 7. Further, a calculation method in the response time calculating unit 120-1 will be described.

Figure 7:
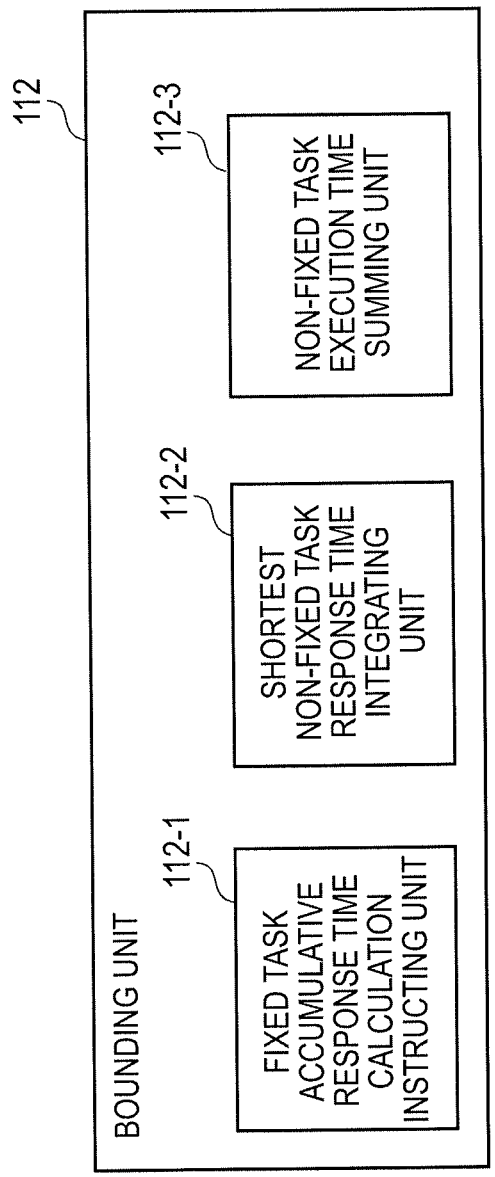
{FIG. 7} A block diagram illustrates a bounding unit according to a first embodiment of the present invention.

Referring to FIG. 7, the bounding unit 112 includes a fixed task accumulative response time calculation instructing unit 112-1, a shortest non-fixed task response time integrating unit 112-2, and a non-fixed task execution time summing unit 112-3.

The fixed task accumulative response time calculation instructing unit 112-1, the shortest non-fixed task response time integrating unit 112-2, and the non-fixed task execution time summing unit 112-3 take charge of dealing with a function of obtaining a bound value of an evaluation function among functions of the bounding unit 112. Further, considered are two cases, that is, a case in which a better allocation is obtained when an evaluation function value is larger, and a case in which a better allocation is obtained when an evaluation function value is smaller, but the case in which a better allocation is obtained when an evaluation function value is smaller will be described below as an example. In the following description, a fixed task refers to a task in which a core allocation is already fixed in a sub problem. A non-fixed task refers to a task in which a core allocation is not fixed yet in a sub problem but is to be fixed in a subsequent process.

First, a calculation of a bound value of an evaluation function includes two calculations, that is, a calculation of a portion (hereinafter, referred to as a "fixed bound value") in which an evaluation function value is already fixed by a fixed task and a calculation of an evaluation function value (hereinafter, referred to as an "increase bound value") that is expected to increase as a task allocation of a non-fixed task is fixed in the future. The calculation of the fixed bound value is performed by the fixed task accumulative response time calculation instructing unit 112-1. The calculation of the increase bound value is performed by the shortest non-fixed task response time integrating unit 112-2 and the non-fixed task execution time summing unit 112-3.

The fixed task accumulative response time calculation instructing unit 112-1 gives an instruction to calculate an accumulative response time by transferring a core allocation of a fixed task to the accumulative response time calculating unit 120. The accumulative response time calculating unit 120 calculates an accumulative response time based on the core allocation of the fixed task, and transfers the calculated accumulative response time to the bounding unit 112 to calculate the fixed bound value.

Next, the shortest non-fixed task response time integrating unit 112-2 performs the calculation of the increase bound value as follows.

First, a state in which sub problem generation of several tiers has been already performed and so several fixed tasks are present is considered. Here, when a non-fixed task is newly added, a non-fixed task is lower in priority than a fixed task. For this reason, a response time of a non-fixed task is longer than a shortest response time (hereinafter, referred to as a "shortest non-fixed task response time") determined as a result of comparing a response time of a fixed task with a lowest priority in each core. For this reason, an evaluation function value increased by fixing all of the remaining tasks is larger than a value obtained by multiplying the shortest non-fixed task response time by the number of the remaining tasks. The shortest non-fixed task response time integrating unit 112-2 calculates the value obtained by multiplying the shortest non-fixed task response time by the number of the remaining tasks as a part of the increase bound value.

Finally, the non-fixed task execution time summing unit 112-3 performs the calculation of the increase bound value as follows.

First, a state in which sub problem generation of several tiers has been already performed and so several fixed tasks are present is considered. Here, when a non-fixed task is newly added, for a response time of a non-fixed task, at least an execution time of an added task is added in addition to the fixed task shortest response time. For this reason, the non-fixed task execution time summing unit 112-3 calculates a part of the increase bound value by summing all of execution times of non-fixed tasks.

Here, since the increase bound values which are calculated by the shortest non-fixed task response time integrating unit 112-2 and the non-fixed task execution time summing unit 112-3 are elements independent of each other, a value obtained by summing both values may be used as the increase bound value.

Next, a calculation of a response time in the response time calculating unit 120-1 will be described. A technique of calculating a worst response time described in NPLT 1 can be applied to a calculation of a response time. The outline of this technique will be described below.

First, in a single core, a work load for a task TM expressed by Formula 1 represents the sum of workloads of processors occurred by the task TM and all tasks with priority higher than the task TM, to which an activation instruction is given during a time period expressed by Formula 2, and is calculated by Formula 3.

$$Workload_m(t) \quad \{Formula\ 1\}$$

$$[0,t) \quad \{Formula\ 2\}$$

$$Workload_m(t) = \sum_{i=1}^{m} \left\lceil \frac{t}{T_i} \right\rceil C_i \quad \{Formula\ 3\}$$

Here, Formula 4 is a minimum integer equal to or larger than x, and corresponds to a value obtained by rounding off or rounding up or down a number after a decimal point.

$$\lceil x \rceil \quad \{Formula\ 4\}$$

Here, when a workload is 1, it means that processing of a processor finishes at a time 1.

$$Workload_m(t) = \sum_{i=1}^{m} \left\lceil \frac{t}{T_i} \right\rceil C_i = t \quad \{Formula\ 5\}$$

Thus, when t that satisfies Formula 5 is present, that is, when a point at which a workload accumulated until a time t becomes equal to an elapsed time t is present, the remaining workload of a processor at the time t becomes 0 (zero). The time t is a worst response time of the task τm. When the time t is in a range expressed in Formula 6 (Dm is a deadline time of the task τm), it can be determined that the task τm satisfies a deadline constraint.

$$0 \le t \le D_m \quad \{Formula\ 6\}$$

Here, the worst response time may be calculated using a regression relation of Formula 7 and Formula 8.

$$w^0 = \sum_{i=1}^{m} C_i \quad \{Formula\ 7\}$$

$$w^{k+1} = Workload_m(w^k) \quad \{Formula\ 8\}$$

In the regression relation, when Formula 10 is satisfied in a range expressed in Formula 9, a calculation stops.

$$0 \le t \le D_m \quad \{Formula\ 9\}$$

$$w^{m^1} = w^{m^1+1} \quad \{Formula\ 10\}$$

Meanwhile, when Formula 12 is not satisfied in a range expressed in Formula 11, a deadline miss occurs.

$$0 \le t \le D_m \quad \{Formula\ 11\}$$

$$w^{m^1} = w^{m^1+1} \quad \{Formula\ 12\}$$

For a calculation of the worst response time of the task TM in a multi-core system, a workload formula is constructed using a task on the same core as the task TM.

Finally, the response time accumulating unit 120-2 sums the response times of each of the tasks calculated by the response time calculating unit 120-1, and thus calculates the accumulative response time.

A basic operation according to the first embodiment is the same as the operation illustrated in the flowchart of FIG. 6, and thus a description thereof will not be made. Through the configuration according to the present first embodiment, the same effects as in the embodiment can be obtained.

In the first embodiment, the bounding unit 112 includes the fixed task accumulative response time calculation instructing unit 112-1, the shortest non-fixed task response time integrating unit 112-2, and the non-fixed task execution time summing unit 112-3 as its components. However, since each of the three components calculates an independent element of the bound value of the evaluation function, the bounding unit 112 may be configured to include some of the three components. Specifically, the following variations are conceivable.

(1) A configuration in which the bounding unit 112 includes the fixed task accumulative response time calculation instructing unit 112-1

(2) A configuration in which the bounding unit 112 includes the shortest non-fixed task response time integrating unit 112-2

(3) A configuration in which the bounding unit 112 includes the non-fixed task execution time summing unit 112-3

(4) A configuration in which the bounding unit 112 includes the fixed task accumulative response time calculation instructing unit 112-1 and the shortest non-fixed task response time integrating unit 112-2

(5) A configuration in which the bounding unit 112 includes the fixed task accumulative response time calculation instructing unit 112-1 and the non-fixed task execution time summing unit 112-3

(6) A configuration in which the bounding unit 112 includes the shortest non-fixed task response time integrating unit 112-2 and the execution time summing unit 112-3

{Second Embodiment}

Next, a configuration and an operation of a task allocation optimization system 100 according to a second embodiment of the present invention will be described.

Figure 8:
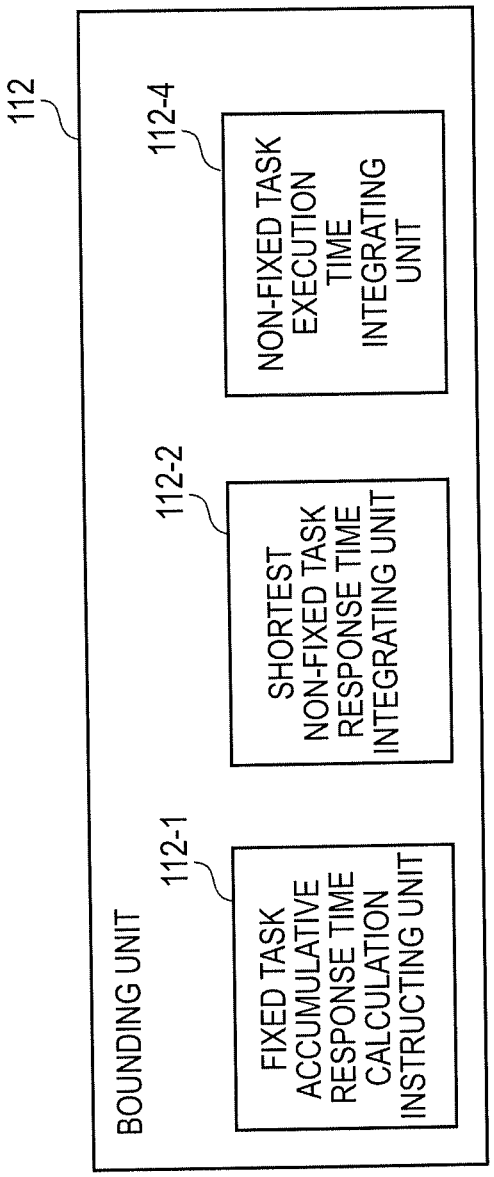
{FIG. 8} A block diagram illustrates a bounding unit according to a second embodiment of the present invention.

The task allocation optimization system 100 of the second embodiment is different from that of the first embodiment in that a non-fixed task execution time integrating unit 112-4 is provided instead of the non-fixed task execution time summing unit 112-3 included in the bounding unit 112 of the task optimization system according to the first embodiment as illustrated in FIG. 8.

Next, a function of the non-fixed task execution time integrating unit 112-4 will be described. An operation of the other portion than the non-fixed task execution time integrating unit 112-4 is the same as in the first embodiment, and thus a description thereof will not be made. Further, an overall operation according to the second embodiment is the same as in the first embodiment except for a calculation of an increase bound value by the non-fixed task execution time integrating unit 112-4, and thus a description thereof will not be made.

The non-fixed task execution time integrating unit 112-4 performs a calculation of an increase bound value as follows.

The non-fixed task execution time summing unit 112-3 of the first embodiment simply sums all of execution times of non-fixed tasks, but the non-fixed task execution time integrating unit 112-4 employs a different calculation technique.

Here, a response time of a non-fixed task in a single-core system is considered.

First, a state in which sub problem generation of several tiers has been already performed and so several fixed tasks are presented is considered. Here, when a non-fixed task A is newly added, for a response time of the non-fixed task A, at least an execution time of the non-fixed task A is added in addition to the fixed task shortest response time. When a non-fixed task B is newly added in this state, for a response time of the non-fixed task B, at least an execution time of the non-fixed task B is added in addition to the fixed task shortest response time and the execution time of the non-fixed task A. Here, since an evaluation function is an accumulation of the response time, the increased evaluation function value obtained when the non-fixed task A and the non-fixed task B are added contains the execution time of the non-fixed task A which is added twice. Similarly, when the number of added non-fixed tasks is x, the execution time of the non-fixed task A is added x times, and the execution time of the non-fixed task B is added (x−1) times.

In a multi-core system, a core to which the non-fixed task A is added is not necessarily the same as a core to which the non-fixed task B and another non-fixed task are added. Thus, it should be noted that in a multi-core system including p cores, the number of times of a response time to be added is generally 1/p.

In addition, since the non-fixed tasks B is highly likely to be increased by a core allocation of a subsequent non-fixed task, an error in which a task having a long execution time is added the maximum number of times occurs in the number of times that the execution times of the non-fixed task A and the non-fixed task B are added. Thus, a value having no problem can be calculated as the increase bound value by sorting execution times of non-fixed tasks in ascending order and adding the execution times multiple times, starting from a shortest one.

This process may be expressed as follows. First, the execution times of the non-fixed tasks are sorted in ascending order. An operation of integrating a value obtained by multiplying an execution time of a non-fixed task sorted in ascending order by a value obtained by rounding off or rounding up or down a number after a decimal point of (the number of non-fixed tasks÷the number of cores) each subsequent non-fixed task and then decreasing the number of non-fixed tasks by one for is repeated for all non-fixed tasks.

In other words, when n is a total of the number of tasks, m is the number of fixed tasks, p is the number of cores, and Formula 13 represents an execution time of a remaining task sorted in ascending order, a part of the increase bound value may be calculated using Formula 14.

$$C^1{}_i \qquad \{\text{Formula 13}\}$$

$$\sum_{i=m+1}^{n} \left( C^1{}_i \times \left\lceil \frac{n-i+1}{p} \right\rceil \right) \qquad \{\text{Formula 14}\}$$

Here, since the shortest non-fixed task response time integrating unit 112-2 and the non-fixed task execution time integrating unit 112-4 calculate elements independent of each other, a value obtained by summing both values may be used as the increase bound value.

Further, in the second embodiment, the bounding unit 112 includes the fixed task accumulative response time calculation instructing unit 112-1, the shortest non-fixed task response time integrating unit 112-2, and the non-fixed task execution time integrating unit 112-4 as its components. However, since each of the three components calculates an independent element of the bound value of the evaluation function, the bounding unit 112 may be configured to include some of the three components. Among concrete variations, the following variations which have not been described in the first embodiment are conceivable.

(1) A configuration in which the bounding unit 112 includes the non-fixed task execution time integrating unit 112-4

(2) A configuration in which the bounding unit 112 includes the fixed task accumulative response time calculation instructing unit 112-1 and the non-fixed task execution time integrating unit 112-4

(3) A configuration in which the bounding unit 112 includes the shortest non-fixed task response time integrating unit 112-2 and the execution time integrating unit 112-4

{Third Embodiment}

Next, a configuration and an operation of a task allocation optimization system according to a third embodiment of the present invention will be described.

Figure 9:
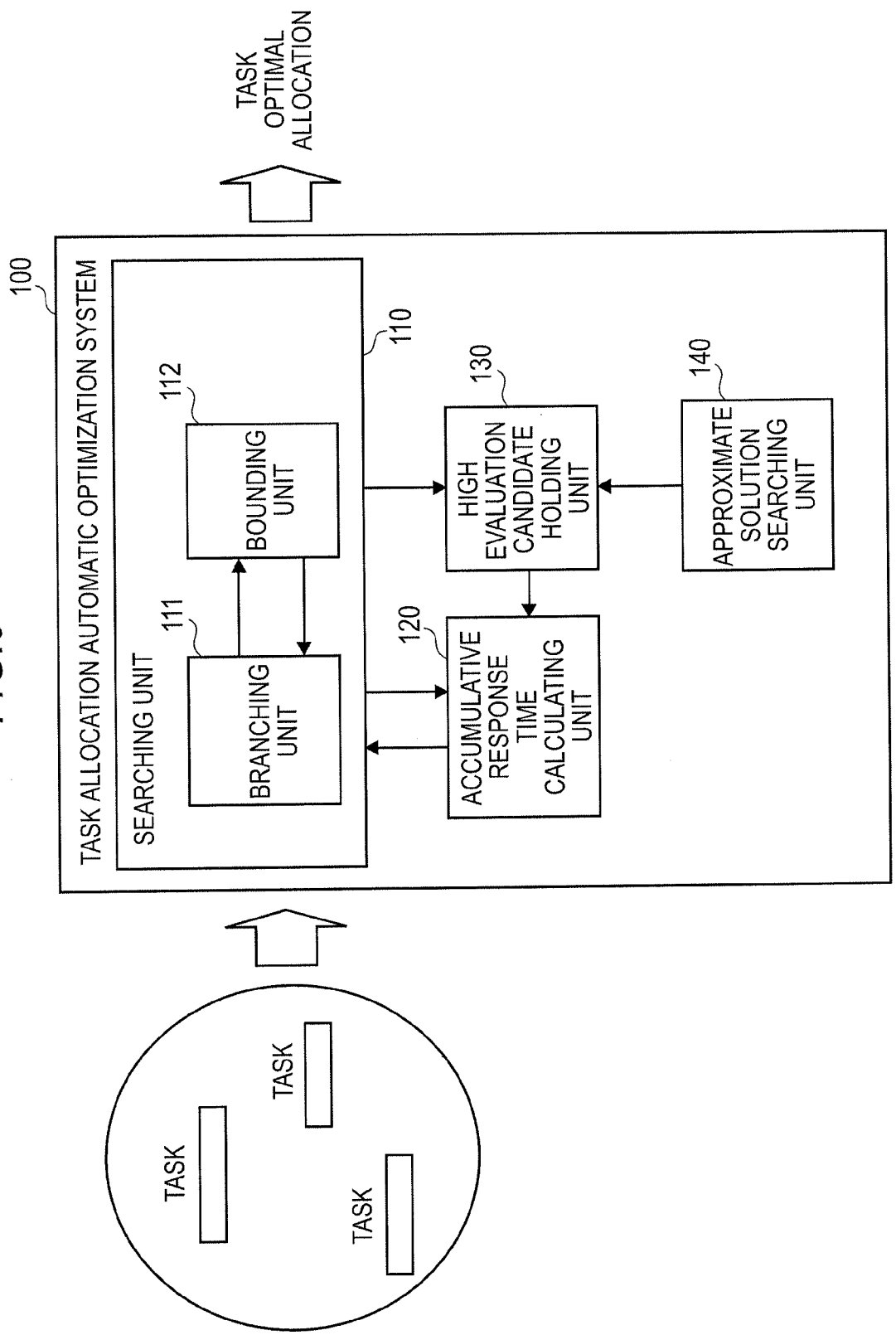
{FIG. 9} A block diagram illustrates a basic configuration according to a third embodiment of the present invention.

The task allocation optimization system 100 of the third embodiment is configured to further include an approximate solution searching unit 140 in addition to the task optimization system 100 of the first embodiment or the second embodiment as illustrated in FIG. 9.

Next, a function of the approximate solution searching unit 140 will be described. An operation of portions other than the approximate solution searching unit 140 is the same as in the first embodiment or the second embodiment, and thus a description thereof will not be made. Further, the approximate solution searching unit 140 of the third embodiment may be combined with the bounding unit 112 of the first embodiment or may be combined with the bounding unit 112 of the second embodiment.

The approximate solution searching unit 140 searches for the task allocation candidate more rapidly than the searching unit 110 through a technique simpler than optimization performed by the searching unit 110, and registers the found candidate to the high evaluation candidate holding unit 130. A general approximate solution method of optimization such as a hill climbing method may be used as a simple method. In this search, an evaluation function value of a candidate which is slightly insufficient is not problematic, but the speed needs to be sufficiently faster than the searching unit 110.

Figure 10:
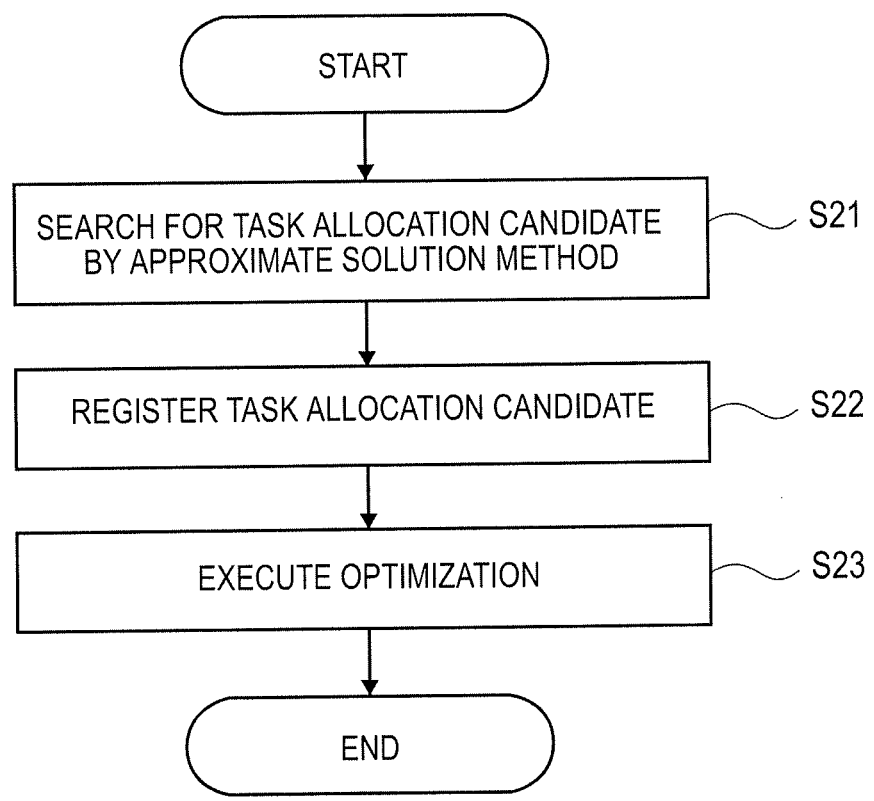
{FIG. 10} A flowchart illustrates an operation of an approximate solution searching unit according to the third embodiment of the present invention.

Next, an operation of the automatic optimization system 100 according to the third embodiment of the present invention will be described with reference to a flowchart of FIG. 10.

First, in step S21, the approximate solution searching unit 140 generates a task allocation candidate by an approximate solution method. Then, in step S22, the approximate solution searching unit 140 registers the generated candidate. Subsequently, in step S23, the searching unit 110 performs optimization. This operation is the same as the operation of the flowchart of FIG. 6 which illustrates the operations of the first embodiment and the second embodiment, and thus a description thereof will not be repeated.

Next, effects of the third embodiment of the present invention will be described.

At the initial stage to start optimization, a task allocation candidate with a low score is generally found. Thus, a value calculated as a bound value of an evaluation function value permissible to a sub problem is much larger than a score of a currently found task allocation candidate, and thus effective bounding may not be performed. Here, in the third embodiment of the present invention, before optimization by the searching unit 110, a candidate of a relatively satisfactory solution is obtained by a high-speed approximate solution method and then registered to the high evaluation candidate holding unit 130 in advance. For this reason, when optimization by the searching unit 110 starts, a bounding process can be performed based on the evaluation function value, and the process can be performed at a high speed.

{Fourth Embodiment}

Next, a configuration and an operation of a task allocation optimization system 100 according to a fourth embodiment of the present invention will be described. In the fourth embodiment, roughly, the bounding process is performed not in the first half of optimization but in the second half.

Figure 11:
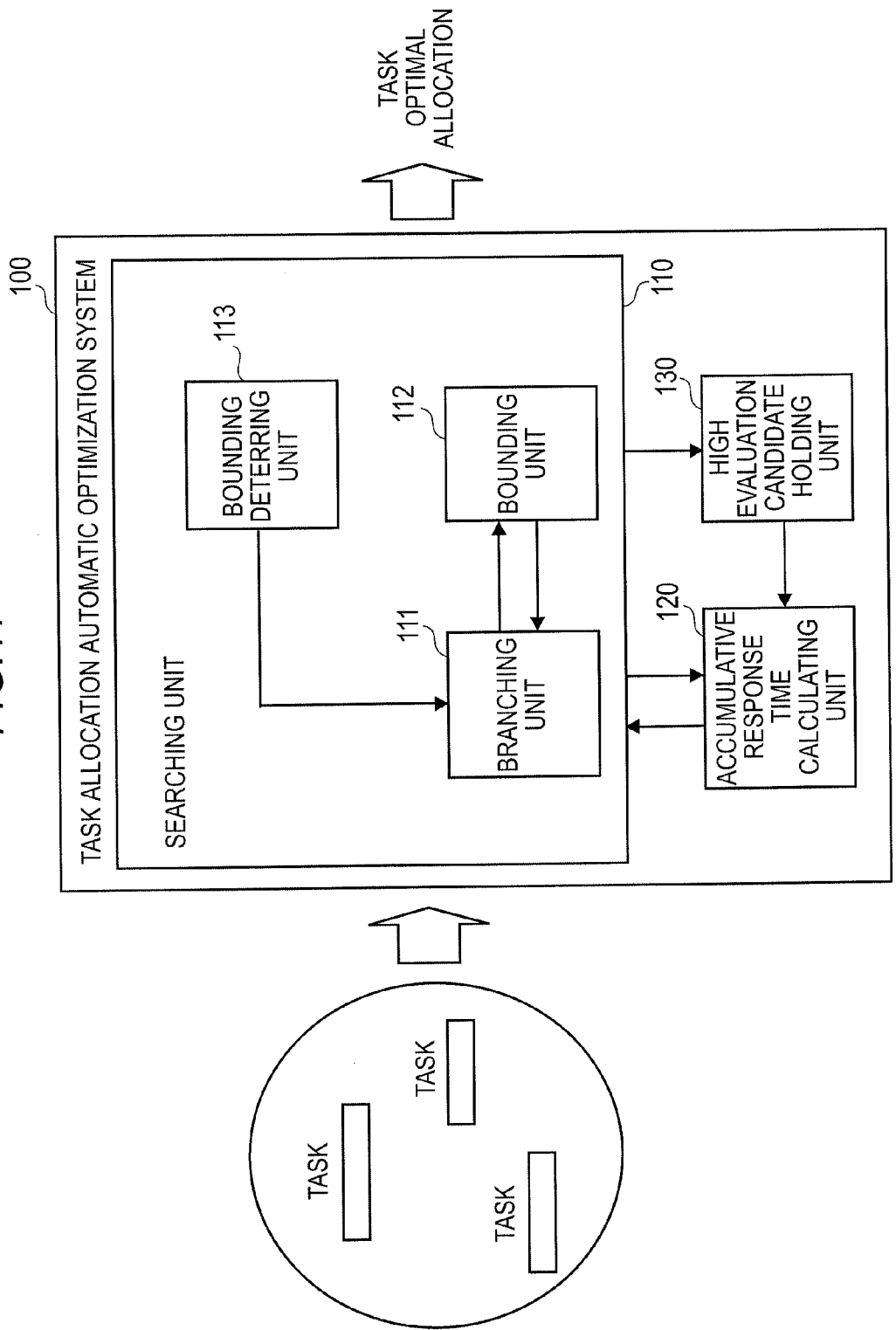
{FIG. 11} A block diagram illustrates a basic configuration according to a fourth embodiment of the present invention.

The task allocation optimization system 100 of the fourth embodiment is different from the first embodiment or the second embodiment in that the searching unit 110 of the task optimization system further includes a bounding deterring unit 113 as illustrated in FIG. 11. Further, the approximate solution searching unit 140 illustrated in FIG. 9 may be combined with the bounding deterring unit 113, that is, a combination of the third embodiment and the fourth embodiment may be made.

Next, an operation of the bounding deterring unit 113 will be described. Further, the same components as in the first embodiment or the second embodiment except for the bounding deterring unit 113 perform the same operation as in the first embodiment or the second embodiment, and thus a description thereof will not be made.

The bounding deterring unit 113 deters the bounding unit 112 from performing the bounding process when the number of fixed tasks is small. The number of fixed tasks to invoke the deterring operation may be calculated by an arbitrary method such as a method of performing a calculation based on a total of the number of tasks (for example, when it becomes a half (½) a total of the number of tasks) or a method of recording a value in which the number of fixed tasks to effectively operate the deterring operation is measured for each total of the number of tasks in advance.

Figure 12:
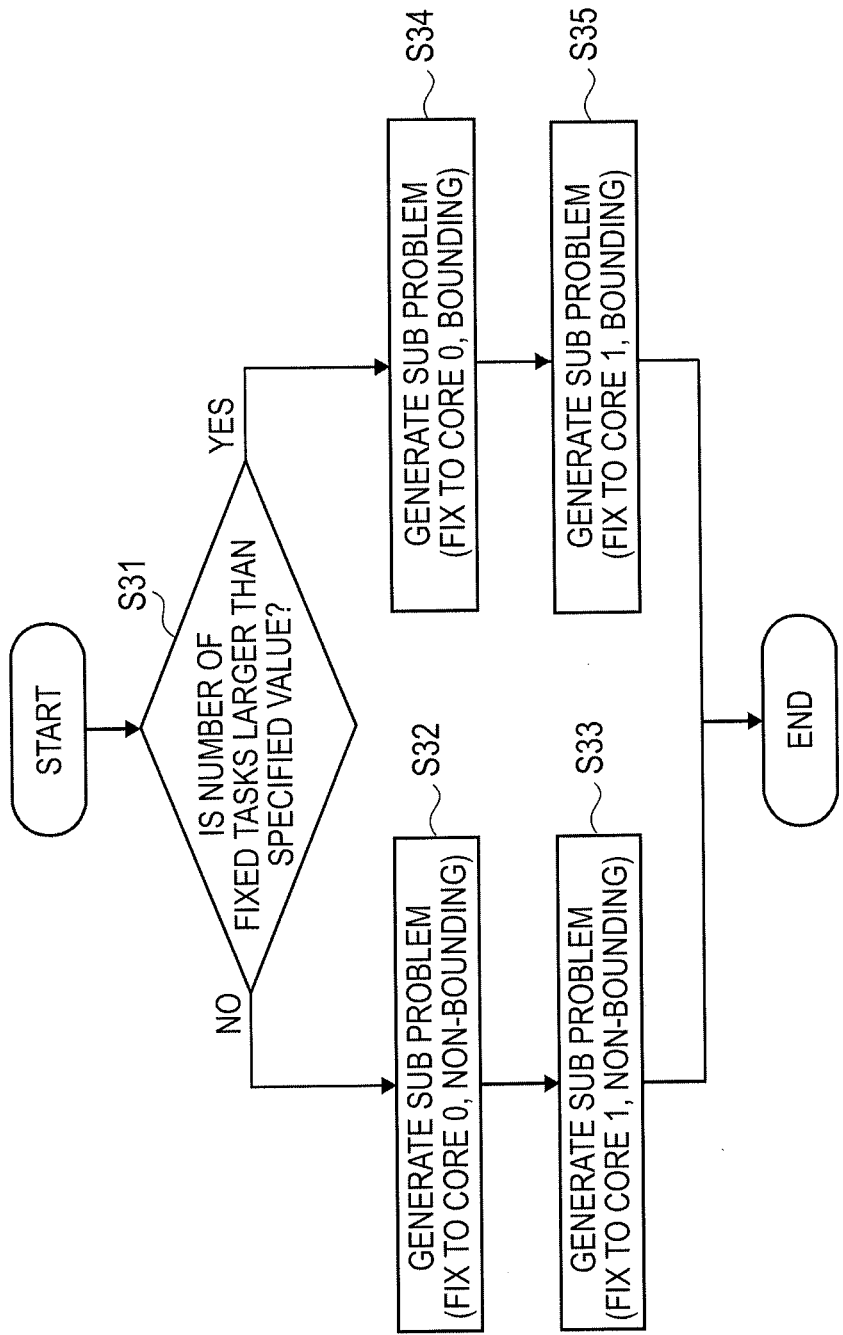
{FIG. 12} A flowchart illustrates a basic operation according to the fourth embodiment of the present invention.
Figure 13:
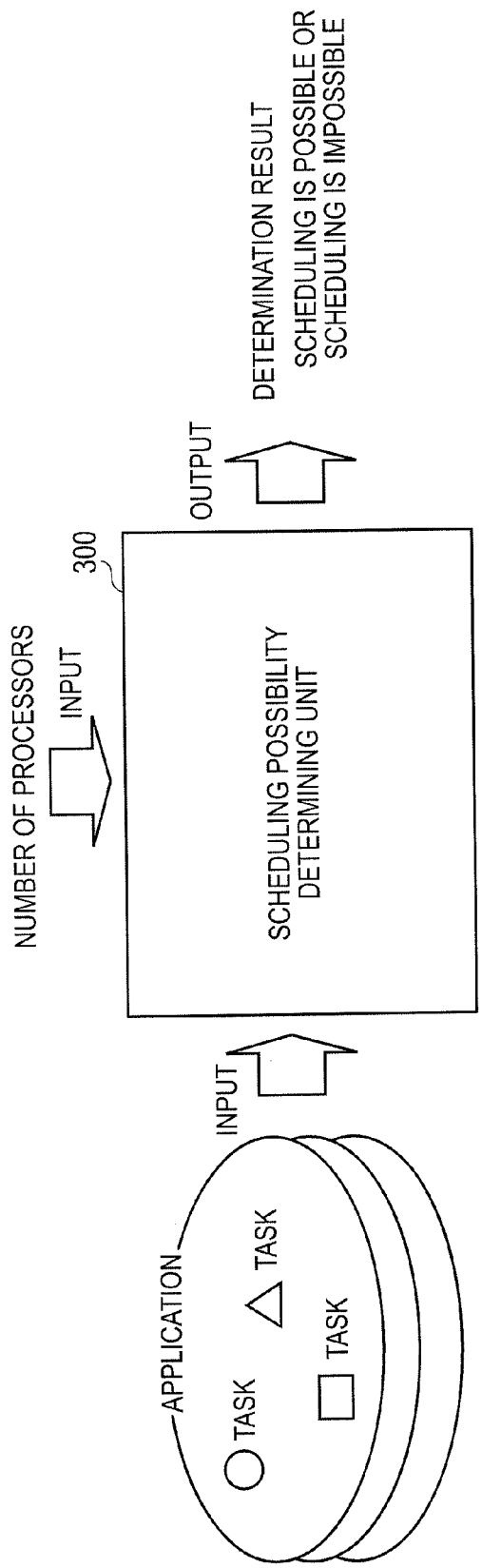
{FIG. 13} A diagram illustrates a technique disclosed in PLT 1.

Next, an operation of the automatic optimization system according to the fourth embodiment will be described with reference to a flowchart of FIG. 12. For convenience sake, an operation assuming a dual-core system will be described, but the present technique is not limited to a dual-core system and can be similarly applied to a system having an arbitrary number of three or more cores.

First, in step S31, the bounding deterring unit 113 determines whether or not the number of fixed tasks is larger than a specified value. When it is determined the number of fixed tasks is not larger than the specified value (No in step S31), the process proceeds to step S32. However, when it is determined the number of fixed tasks is larger than the specified value (Yes in step S31), the process proceeds to step S34.

When it is determined the number of fixed tasks is not larger than the specified value, in step S32, the branching unit 111 generates a sub problem in which a core allocation of a task to be fixed next is set to zero (0). The sub problem generated at this time is subjected to the process based on the flowchart of FIG. 12 similarly to an operation described herein, and the process related to the bounding operation is not performed. In other words, only sub problem generation is performed. Subsequently, in step S33, the branching unit 111 generates a sub problem in which a core allocation of a task to be fixed next is set to one (1). The generated sub problem is similarly subjected to the process based on the flowchart of FIG. 12.

When it is determined the number of fixed tasks is larger than the specified value, in step S34, the branching unit 111 generates a sub problem in which a core allocation of a task to be fixed next is set to zero (0). The sub problem generated at this time is subjected to the process based on the flowchart of FIG. 6 similarly to the first embodiment or the like unlike an operation described herein. In other words, the bounding process by the bounding unit 112 starts from this stage. Subsequently, in step S35, the branching unit 111 generates a sub problem in which a core allocation of a task to be fixed next is set to one (1). The generated sub problem is similarly subjected to the process based on the flowchart of FIG. 6.

Next, effects of the fourth embodiment of the present invention will be described.

In a state in which the number of fixed tasks is small, a fluctuation range of an evaluation function value is large since a subsequent non-fixed task is added. For this reason, a pessimistic value is calculated as a bound value of an evaluation function value, which is permissible to a sub problem, which is calculated to perform the bounding operation. Thus, an overhead occurring by a calculation of a bound value may be larger than an increase in the speed by a reduction in the number of sub problems by the bounding operation. In this regard, in the fourth embodiment of the present invention, for a sub problem in which the number of fixed tasks is small, the bounding process is not performed, and the bounding value is not calculated. Through this operation, bound value calculation overhead for a sub problem, in which the number of fixed tasks is small, from which the bounding effect is not obtained can be eliminated, and thus the optimization process can be performed at a high speed.

The effects of the above embodiments of the present invention can be summarized as follows.

A first effect is that an allocation with a better performance can be searched for from among a plurality of task allocations that can be scheduled.

The reason is because a task allocation with a good performance is obtained such that the accumulative response time calculating unit calculates an evaluation function value which is an index representing excellence in performance of a task allocation candidate and performs optimization using the evaluation function value.

A second effect is that it is possible to increase the margin from a deadline which is an important index from a point of view of system stability in a real-time system.

The reason is because a task allocation causing a response time of each task to be as small as possible is obtained such that the accumulative response time calculating unit calculates an accumulative value of a response time (a time until execution of a task finishes after task activation is instructed) of each of a plurality of tasks which are core allocation decision targets, and performs optimization to minimize an accumulative value of a response time of each of a plurality of tasks which are core allocation decision targets.

A third effect is that a time necessary for optimization can be reduced.

A first reason is because the bounding unit performs the bounding operation of deterring an unnecessary task allocation candidate from being searched when a task allocation candidate is searched.

A second reason is because before optimization, a candidate of a relative satisfactory solution is obtained and registered by a high-speed approximate solution method, and when optimization starts, the bounding operation is performed based on the evaluation function value.

A third reason is because the bounding process is not performed, and the bound value is not calculated, for a sub problem in which the number of fixed tasks is small, and thus bound value calculation overhead for a sub problem, in which the number of fixed tasks is small, from which the bounding effect is not obtained is eliminated.

Further, the task allocation optimization system according to the embodiments of the present invention may be implemented by hardware, but may be implemented such that a computer reads a program causing a computer to function as the task allocation optimization system from a computer readable recording medium, and then executes the read program.

Further, the task allocation optimization method according to the embodiments of the present invention may be implemented by hardware, but may be implemented such that a computer reads a program causing a computer to execute the method from a computer readable recording medium, and then executes the read program.

Furthermore, the above embodiments are preferred embodiments of the present invention. A range of the present invention is not limited to the above embodiments, and various modifications can be made within a range not departing from the gist of the present invention.

This application is based on Japanese Patent Application No. 2010-034736 filed on Feb. 19, 2010, and claims priority to and the benefit of Japanese Patent Application No. 2010-034736. The disclosure of Japanese Patent Application No. 2010-034736 is incorporated by reference herein. The exemplary embodiments of the present invention have been described in detail, but it should be understood that various changes, substitutions, and alternatives may occur without departing from the spirit and range of the invention defined in the appended claims. Further, even if a claim is amended during an application procedure, the inventor (s) intends to maintain the equivalent range of the inventions set forth in the appended claims.

All or some of the above embodiments may be described as in the following additional notes, and the present invention is not limited to the following additional notes.

(Additional Note 1) A task allocation optimization system for a multi-core processor including a plurality of cores, including:

an accumulative response time calculating unit that calculates a response time of each of a plurality of tasks which are core allocation decision targets, and outputs an accumulative value of the calculated response time as an evaluation function value which is an index representing excellence of a task allocation;

a searching unit that searches for a task allocation from which a good evaluation function value is calculated based on the evaluation function value; and a high evaluation candidate holding unit that holds a candidate having a good evaluation function value among a plurality of task allocation candidates searched by the searching unit.

(Additional Note 2) The task allocation optimization system according to Additional Note 1, wherein the searching unit includes a branching unit that generates a sub problem by allocating a task to a core in order of from a task with a high priority to a task with a low priority, and a bounding unit that calculates a bound value of the evaluation function value permissible to the sub problem, and performs a bounding operation to stop an unnecessary core allocation candidate search using the calculated bound value of the evaluation function value, and the bounding unit includes a fixed task accumulative response time calculation instructing unit that calculates the bound value using the evaluation function value calculated using a task already allocated to a core.

(Additional Note 3) The task allocation optimization system according to Additional Note 1, wherein the searching unit includes a branching unit that generates a sub problem by allocating a task to a core in order of from a task with a high priority to a task with a low priority, and a bounding unit that calculates a bound value of the evaluation function value permissible to the sub problem, and performs a bounding operation to stop an unnecessary core allocation candidate search using the calculated bound value of the evaluation function value, and wherein the bounding unit includes a shortest non-fixed task response time integrating unit that calculates a bound value by comparing a response time of a fixed task which is a task with a lowest priority already allocated to a core in each core on each core and multiplying a shortest response time determined as a result of the comparison by the number of remaining tasks.

(Additional Note 4) The task allocation optimization system according to Additional Note 1, wherein the searching unit includes a branching unit that generates a sub problem by allocating a task to a core in order of from a task with a high priority to a task with a low priority, and a bounding unit that calculates a bound value of the evaluation function value permissible to the sub problem, and performs a bounding operation to stop an unnecessary core allocation candidate search using the calculated bound value of the evaluation function value, and wherein the bounding unit includes a non-fixed task execution time summing unit that calculates a bound value by summing all of execution times of non-fixed tasks which are tasks in which allocation is not fixed yet.

(Additional Note 5) The task allocation optimization system according to Additional Note 1, wherein the searching unit includes a branching unit that generates a sub problem by allocating a task to a core in order of from a task with a high priority to a task with a low priority, and a bounding unit that calculates a bound value of the evaluation function value permissible to the sub problem, and performs a bounding operation to stop an unnecessary core allocation candidate search using the calculated bound value of the evaluation function value, and wherein the bounding unit includes a non-fixed task execution time integrating unit that calculates a bound value by repeating, on all of non-fixed tasks, operations of sorting execution times of non-fixed tasks which are tasks in which allocation is not fixed yet in ascending order, integrating a value obtained by multiplying the execution time of the non-fixed task sorted in ascending order by a value obtained by rounding off or rounding up or down a number after a decimal point of (the number of non-fixed tasks÷ the number of cores) for each non-fixed task, and reducing the number of non-fixed tasks by one.

(Additional Note 6) The task allocation optimization system according to any one of Additional Notes 2 to 5, wherein the searching unit further includes a bounding deterring unit that deters the bounding unit from performing the bounding operation when the number of tasks in which allocation is already fixed is smaller than a specified value.

(Additional Note 7) The task allocation optimization system according to any one of Additional Notes 1 to 6, further including an approximate solution searching unit that finds a task allocation candidate faster than the searching unit by performing an approximate solution search in advance, and registers the found task allocation candidate to the high evaluation candidate holding unit.

(Additional Note 8) A task allocation optimization method for a multi-core processor including a plurality of cores, including:

an accumulative response time calculating step of calculating a response time of each of a plurality of tasks which are core allocation decision targets, and outputting an accumulative value of the calculated response time as an evaluation function value which is an index representing excellence of a task allocation;

a searching step of searching for a task allocation from which a good evaluation function value is calculated based on the evaluation function value; and a high evaluation candidate holding step of holding a candidate having a good evaluation function value among a plurality of task allocation candidates searched by the searching step.

(Additional Note 9) The task allocation optimization method according to Additional Note 8, wherein the searching step includes a branching step of generating a sub problem by allocating a task to a core in order of from a task with a high priority to a task with a low priority, and a bounding step of calculating a bound value of the evaluation function value permissible to the sub problem, and performing a bounding operation to stop an unnecessary core allocation candidate search using the calculated bound value of the evaluation function value, and wherein the bounding step includes a fixed task accumulative response time calculation instructing step of calculating the bound value using the evaluation function value calculated using a task already allocated to a core.

(Additional Note 10) The task allocation optimization method according to Additional Note 8, wherein the searching step includes a branching step of generating a sub problem by allocating a task to a core in order of from a task with a high priority to a task with a low priority, and a bounding step of calculating a bound value of the evaluation function value permissible to the sub problem, and performing a bounding operation to stop an unnecessary core allocation candidate search using the calculated bound value of the evaluation function value, and wherein the bounding step includes a shortest non-fixed task response time integrating step of calculating a bound value by comparing a response time of a fixed task which is a task with a lowest priority already allocated to a core in each core on each core and multiplying a shortest response time determined as a result of the comparison by the number of remaining tasks.

(Additional Note 11) The task allocation optimization method according to Additional Note 8, wherein the searching step includes a branching step of generating a sub problem by allocating a task to a core in order of from a task with a high priority to a task with a low priority, and a bounding step of calculating a bound value of the evaluation function value permissible to the sub problem, and performing a bounding operation to stop an unnecessary core allocation candidate search using the calculated bound value of the evaluation function value, and wherein the bounding step includes a non-fixed task execution time summing step of calculating a bound value by summing all of execution times of non-fixed tasks which are tasks in which allocation is not fixed yet.

(Additional Note 12) The task allocation optimization method according to Additional Note 8, wherein the searching step includes a branching step of generating a sub problem by allocating a task to a core in order of from a task with a high priority to a task with a low priority, and a bounding step of calculating a bound value of the evaluation function value permissible to the sub problem, and performing a bounding operation to stop an unnecessary core allocation candidate search using the calculated bound value of the evaluation function value, and wherein the bounding step includes a non-fixed task execution time integrating step of calculating a bound value by repeating, on all of non-fixed tasks, operations of sorting execution times of non-fixed tasks which are tasks in which allocation is not fixed yet in ascending order, integrating a value obtained by multiplying the execution time of the non-fixed task sorted in ascending order by a value obtained by rounding off or rounding up or down a number after a decimal point of (the number of non-fixed tasks÷the number of cores) for each non-fixed task, and reducing the number of non-fixed tasks by one.

(Additional Note 13) The task allocation optimization method according to any one of Additional Notes 9 to 12, wherein the searching step further includes a bounding deterring step of deterring the bounding operation in the bounding step when the number of tasks in which allocation is already fixed is smaller than a specified value.

(Additional Note 14) The task allocation optimization method according to any one of Additional Notes 8 to 13, further including an approximate solution searching step of finding a task allocation candidate faster than in the searching step by performing an approximate solution search in advance, and registering the found task allocation candidate in the high evaluation candidate holding step.

(Additional Note 15) A task allocation optimization program that is incorporated in a task allocation optimization system for a multi-core processor including a plurality of cores and causes a computer to function as the system, the system including:

an accumulative response time calculating unit that calculates a response time of each of a plurality of tasks which are core allocation decision targets, and outputs an accumulative value of the calculated response time as an evaluation function value which is an index representing excellence of a task allocation;

a searching unit that searches for a task allocation from which a good evaluation function value is calculated based on the evaluation function value; and a high evaluation candidate holding unit that holds a candidate having a good evaluation function value among a plurality of task allocation candidates searched by the searching unit.

(Additional Note 16) The task allocation optimization program according to Additional Note 15, wherein the searching unit includes a branching unit that generates a sub problem by allocating a task to a core in order of from a task with a high priority to a task with a low priority, and a bounding unit that calculates a bound value of the evaluation function value permissible to the sub problem, and performs a bounding operation to stop an unnecessary core allocation candidate search using the calculated bound value of the evaluation function value, and wherein the bounding unit causes a computer to function as the task allocation optimization system including a fixed task accumulative response time calculation instructing unit that calculates the bound value using the evaluation function value calculated using a task already allocated to a core.

(Additional Note 17) The task allocation optimization program according to Additional Note 15, wherein the searching unit includes a branching unit that generates a sub problem by allocating a task to a core in order of from a task with a high priority to a task with a low priority, and a bounding unit that calculates a bound value of the evaluation function value permissible to the sub problem, and performs a bounding operation to stop an unnecessary core allocation candidate search using the calculated bound value of the evaluation function value, and the bounding unit includes a shortest non-fixed task response time integrating unit that calculates a bound value by comparing a response time of a fixed task which is a task with a lowest priority already allocated to a core in each core on each core and multiplying a shortest response time determined as a result of the comparison by the number of remaining tasks.

(Additional Note 18) The task allocation optimization program according to Additional Note 15, wherein the searching unit includes a branching unit that generates a sub problem by allocating a task to a core in order of from a task with a high priority to a task with a low priority, and a bounding unit that calculates a bound value of the evaluation function value permissible to the sub problem, and performs a bounding operation to stop an unnecessary core allocation candidate search using the calculated bound value of the evaluation function value, and wherein the bounding unit includes a non-fixed task execution time summing unit that calculates a bound value by summing all of execution times of non-fixed tasks which are tasks in which allocation is not fixed yet.

(Additional Note 19) The task allocation optimization program according to Additional Note 15, wherein the searching unit includes a branching unit that generates a sub problem by allocating a task to a core in order of from a task with a high priority to a task with a low priority, and a bounding unit that calculates a bound value of the evaluation function value permissible to the sub problem, and performs a bounding operation to stop an unnecessary core allocation candidate search using the calculated bound value of the evaluation function value, and wherein the bounding unit includes a non-fixed task execution time integrating unit that calculates a bound value by repeating, on all of non-fixed tasks, operations of sorting execution times of non-fixed tasks which are tasks in which allocation is not fixed yet in ascending order, integrating a value obtained by multiplying the execution time of the non-fixed task sorted in ascending order by a value obtained by rounding off or rounding up or down a number after a decimal point of (the number of non-fixed tasks÷the number of cores) for each non-fixed task, and reducing the number of non-fixed tasks by one.

(Additional Note 20) The task allocation optimization program according to any one of Additional Notes 16 to 19, wherein the searching unit further includes a bounding deterring unit that deters the bounding unit from performing the bounding operation when the number of tasks in which allocation is already fixed is smaller than a specified value.

(Additional Note 21) The task allocation optimization program according to any one of Additional Notes 15 to 20, wherein the task allocation optimization system further includes an approximate solution searching unit that finds a task allocation candidate faster than the searching unit by performing an approximate solution search in advance, and register the found task allocation candidate to the high evaluation candidate holding unit.

{Industrial Applicability}

The present invention can be appropriate, for example, to a developing tool for a device using hardware with a multi-core configuration.

The invention claimed is:

1. A task allocation optimization system for a multi-core processor including a plurality of cores, comprising:

accumulative response time calculating logic configured to calculate a response time of each of a plurality of tasks which are core allocation decision targets, and outputs an accumulative value of the calculated response time as an evaluation function value which is an index representing excellence of a task allocation;

searching logic configured to search for a task allocation from which a good evaluation function value is calculated based on the evaluation function value; and high evaluation candidate holding logic configured to hold a candidate having a good evaluation function value among a plurality of task allocation candidates searched by the searching logic;

wherein:

one or more of the calculating logic, the searching logic, and the holding logic are implemented by a processor;

the searching logic includes:

branching logic configured to generate a sub problem by allocating a task to a core in order of from a task with a high priority to a task with a low priority, and bounding logic configured to calculate a bound value of the evaluation function value permissible to the sub problem, and performs a bounding operation to stop an unnecessary core allocation candidate search using the calculated bound value of the evaluation function value, and the bounding logic includes fixed task accumulative response time calculation instructing logic configured to calculate the bound value using the evaluation function value calculated using a task already allocated to a core.

2. The task allocation optimization system according to claim 1, wherein:
the searching logic includes:
branching logic configured to generate a sub problem by allocating a task to a core in order of from a task with a high priority to a task with a low priority, and
bounding logic configured to calculate a bound value of the evaluation function value permissible to the sub problem, and performs a bounding operation to stop an unnecessary core allocation candidate search using the calculated bound value of the evaluation function value, and
the bounding logic includes shortest non-fixed task response time integrating logic configured to calculate a bound value by comparing a response time of a fixed task which is a task with a lowest priority already allocated to a core in each core on each core and multiplying a shortest response time determined as a result of the comparison by the number of remaining tasks.

3. The task allocation optimization system according to claim 1, wherein
the searching logic includes:
branching logic configured to generate a sub problem by allocating a task to a core in order of from a task with a high priority to a task with a low priority, and
bounding logic configured to calculate a bound value of the evaluation function value permissible to the sub problem, and performs a bounding operation to stop an unnecessary core allocation candidate search using the calculated bound value of the evaluation function value, and
the bounding logic includes non-fixed task execution time summing logic configured to calculate a bound value by summing all of execution times of non-fixed tasks which are tasks in which allocation is not fixed yet.

4. The task allocation optimization system according to claim 1, wherein
the searching logic includes:
branching logic configured to generate a sub problem by allocating a task to a core in order of from a task with a high priority to a task with a low priority, and
bounding logic configured to calculate a bound value of the evaluation function value permissible to the sub problem, and performs a bounding operation to stop an unnecessary core allocation candidate search using the calculated bound value of the evaluation function value, and
the bounding logic includes non-fixed task execution time integrating logic configured to calculate a bound value by repeating, on all of non-fixed tasks, an operation of sorting execution times of non-fixed tasks which are tasks in which allocation is not fixed yet in ascending order, integrating a value obtained by multiplying the execution time of the non-fixed task sorted in ascending order by a value obtained by rounding off or rounding up or down a number after a decimal point of (the number of non-fixed tasks divided by the number of cores) for each non-fixed task, and reducing the number of non-fixed tasks by one.

5. The task allocation optimization system according to claim 1, wherein the searching logic further includes bounding deterring logic configured to deter the bounding logic from performing the bounding operation when the number of tasks in which allocation is already fixed is smaller than a specified value.

6. The task allocation optimization system according to claim 1, further comprising approximate solution searching logic configured to find a task allocation candidate faster than the searching logic by performing an approximate solution search in advance, and registers the found task allocation candidate to the high evaluation candidate holding logic.

7. A task allocation optimization method for a multi-core processor including a plurality of cores, comprising:
an accumulative response time calculating step of calculating a response time of each of a plurality of tasks which are core allocation decision targets, and outputting an accumulative value of the calculated response time as an evaluation function value which is an index representing excellence of a task allocation;
a searching step of searching for a task allocation from which a good evaluation function value is calculated based on the evaluation function value; and
a high evaluation candidate holding step of holding a candidate having a good evaluation function value among a plurality of task allocation candidates searched by the searching step;
wherein:
the searching step includes
a branching step of generating a sub problem by allocating a task to a core in order of from a task with a high priority to a task with a low priority, and
a bounding step of calculating a bound value of the evaluation function value permissible to the sub problem, and performing a bounding operation to stop an unnecessary core allocation candidate search using the calculated bound value of the evaluation function value, and
the bounding step includes a fixed task accumulative response time calculation instructing step of calculating the bound value using the evaluation function value calculated using a task already allocated to a core.

8. The task allocation optimization method according to claim 7, wherein the searching step includes
branching step of generating a sub problem by allocating a task to a core in order of from a task with a high priority to a task with a low priority, and
bounding step of calculating a bound value of the evaluation function value permissible to the sub problem, and performing a bounding operation to stop an unnecessary core allocation candidate search using the calculated bound value of the evaluation function value, and
wherein the bounding step includes a shortest non-fixed task response time integrating step of calculating a bound value by comparing a response time of a fixed task which is a task with a lowest priority already allocated to a core in each core on each core and multiplying a shortest response time determined as a result of the comparison by the number of remaining tasks.

9. The task allocation optimization method according to claim 7, wherein the searching step includes
branching step of generating a sub problem by allocating a task to a core in order of from a task with a high priority to a task with a low priority, and
bounding step of calculating a bound value of the evaluation function value permissible to the sub problem, and performing a bounding operation to stop an unnecessary core allocation candidate search using the calculated bound value of the evaluation function value, and wherein the bounding step includes a non-fixed task execution time summing step of calculating a bound value by summing all of execution times of non-fixed tasks which are tasks in which allocation is not fixed yet.

10. The task allocation optimization method according to claim 7,
wherein the searching step includes
a branching step of generating a sub problem by allocating a task to a core in order of from a task with a high priority to a task with a low priority, and
a bounding step of calculating a bound value of the evaluation function value permissible to the sub problem, and performing a bounding operation to stop an unnecessary core allocation candidate search using the calculated bound value of the evaluation function value, and
wherein the bounding step includes a non-fixed task execution time integrating step of calculating a bound value by repeating, on all of non-fixed tasks, operations of sorting execution times of non-fixed tasks which are tasks in which allocation is not fixed yet in ascending order, integrating a value obtained by multiplying the execution time of the non-fixed task sorted in ascending order by a value obtained by rounding off or rounding up or down a number after a decimal point of (the number of non-fixed tasks÷the number of cores) for each non-fixed task, and reducing the number of non-fixed tasks by one.

11. The task allocation optimization method according to claim 7, wherein the searching step further includes a bounding deterring step of deterring the bounding operation in the bounding step when the number of tasks in which allocation is already fixed is smaller than a specified value.

12. The task allocation optimization method according to claim 7, further including an approximate solution searching step of finding a task allocation candidate faster than in the searching step by performing an approximate solution search in advance, and registering the found task allocation candidate in the high evaluation candidate holding step.

13. A non-transitory computer readable medium, including a task allocation optimization program, incorporated in a task allocation optimization system for a multi-core processor including a plurality of cores, and enabling a computer to function as a system comprising:
accumulative response time calculating logic configured to calculate a response time of each of a plurality of tasks which are core allocation decision targets, and outputs an accumulative value of the calculated response time as an evaluation function value which is an index representing excellence of a task allocation;
searching logic configured to search for a task allocation from which a good evaluation function value is calculated based on the evaluation function value; and
high evaluation candidate holding logic configured to hold a candidate having a good evaluation function value among a plurality of task allocation candidates searched by the searching logic;
wherein:
the searching logic includes
branching logic configured to generate a sub problem by allocating a task to a core in order of from a task with a high priority to a task with a low priority, and
bounding logic configured to calculate a bound value of the evaluation function value permissible to the sub problem, and performs a bounding operation to stop an unnecessary core allocation candidate search using the calculated bound value of the evaluation function value, and the bounding logic causes a computer to function as the task allocation optimization system including fixed task accumulative response time calculation instructing logic configured to calculate the bound value using the evaluation function value calculated using a task already allocated to a core.

14. The non-transitory computer readable medium according to claim 13, wherein:
the searching logic includes
branching logic configured to generate a sub problem by allocating a task to a core in order of from a task with a high priority to a task with a low priority, and
bounding logic configured to calculate a bound value of the evaluation function value permissible to the sub problem, and performs a bounding operation to stop an unnecessary core allocation candidate search using the calculated bound value of the evaluation function value, and
the bounding logic includes shortest non-fixed task response time integrating logic configured to calculate a bound value by comparing a response time of a fixed task which is a task with a lowest priority already allocated to a core in each core on each core and multiplying a shortest response time determined as a result of the comparison by the number of remaining tasks.

15. The non-transitory computer readable medium according to claim 13, wherein:
the searching logic includes
branching logic configured to generate a sub problem by allocating a task to a core in order of from a task with a high priority to a task with a low priority, and
bounding logic configured to calculate a bound value of the evaluation function value permissible to the sub problem, and performs a bounding operation to stop an unnecessary core allocation candidate search using the calculated bound value of the evaluation function value, and
wherein the bounding logic includes non-fixed task execution time summing logic configured to calculate a bound value by summing all of execution times of non-fixed tasks which are tasks in which allocation is not fixed yet.

16. The non-transitory computer readable medium according to claim 13, wherein:
the searching unit includes:
branching logic configured to generate a sub problem by allocating a task to a core in order of from a task with a high priority to a task with a low priority, and
bounding logic configured to calculate a bound value of the evaluation function value permissible to the sub problem, and performs a bounding operation to stop an unnecessary core allocation candidate search using the calculated bound value of the evaluation function value, and
the bounding logic includes non-fixed task execution time integrating logic configured to calculate a bound value by repeating, on all of non-fixed tasks, operations of sorting execution times of non-fixed tasks which are tasks in which allocation is not fixed yet in ascending order, integrating a value obtained by multiplying the execution time of the non-fixed task sorted in ascending order by a value obtained by rounding off or rounding up or down a number after a decimal point of (the number of non-fixed tasks divided by the number of cores) for each non-fixed task, and reducing the number of non-fixed tasks by one.

17. The non-transitory computer readable medium according to claim 13, wherein the searching logic further includes bounding deterring logic configured to deter the bounding logic from performing the bounding operation when the number of tasks in which allocation is already fixed is smaller than a specified value.

* * * * *

UNITED STATES PATENT AND TRADEMARK OFFICE
CERTIFICATE OF CORRECTION

PATENT NO. : 8,887,165 B2
APPLICATION NO. : 13/579865
DATED : November 11, 2014
INVENTOR(S) : Noriaki Suzuki, Masato Edahiro and Junji Sakai It is certified that error appears in the above-identified patent and that said Letters Patent is hereby corrected as shown below:

In the Specification

Column 9, Line 38: Delete "TM" and insert -- τm --
Column 9, Line 40: Delete "TM" and insert -- τm --
Column 9, Line 41: Delete "TM" and insert -- τm --
Column 10, Line 31: Delete "TM" and insert -- τm --
Column 10, Line 33: Delete "TM" and insert -- τm --

In the Claims

Column 21, Line 42: In Claim 4, delete "wherein" and insert -- wherein: --
Column 21, Line 43: In Claim 4, delete "includes:" and insert -- includes --

Signed and Sealed this
Fourth Day of August, 2015

Michelle K. Lee
*Director of the United States Patent and Trademark Office*